Aug. 23, 1938.   A. D. KONDRATH   2,128,187
REAR VIEW MIRROR AND MOUNTING MEANS THEREFOR
Filed Oct. 25, 1937
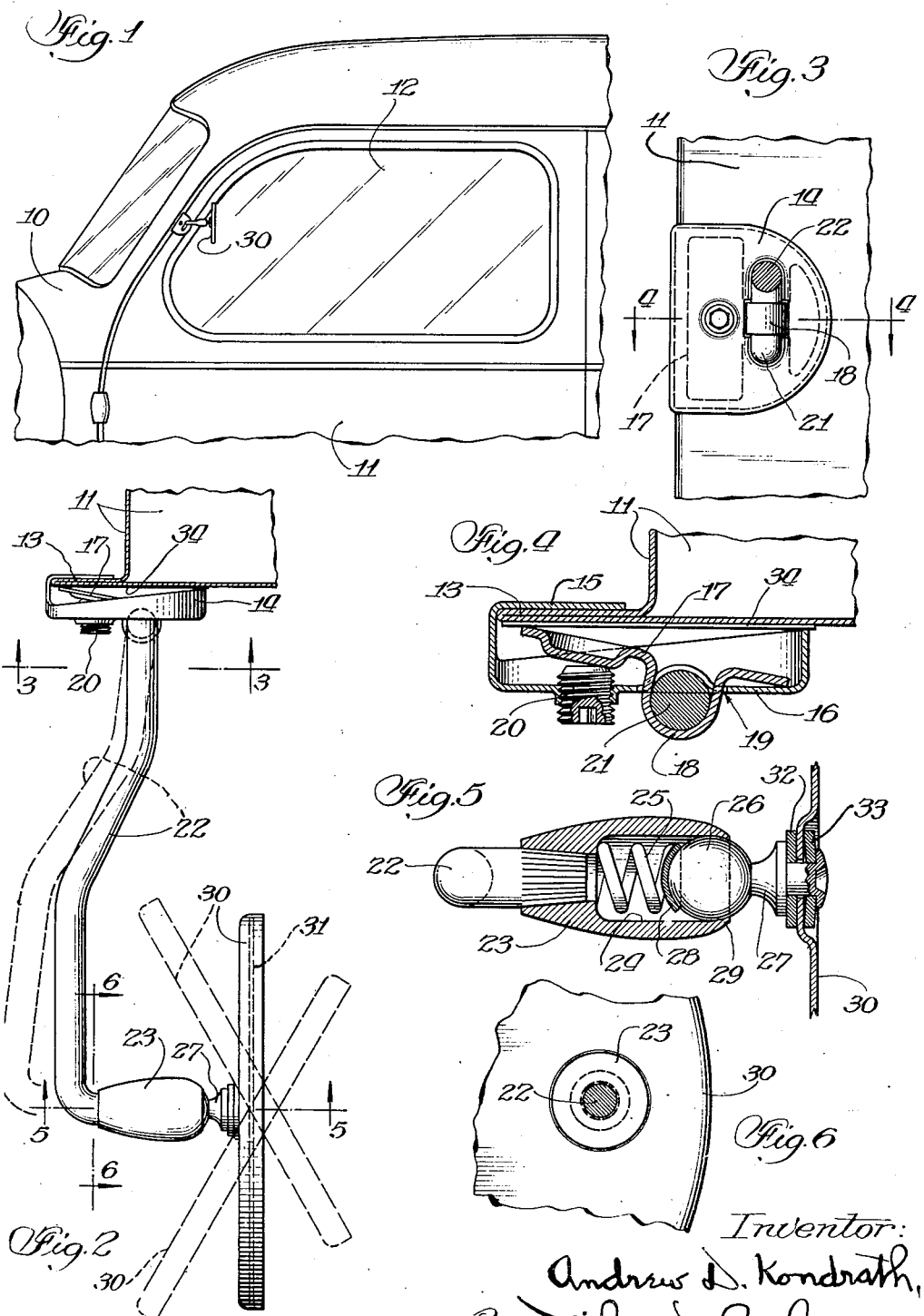
Inventor:
Andrew D. Kondrath,
By: Fricke & DeBusk, att'ys.

Patented Aug. 23, 1938

2,128,187

UNITED STATES PATENT OFFICE 2,128,187

REAR VIEW MIRROR AND MOUNTING MEANS THEREFOR

Andrew D. Kondrath, Chicago, Ill., assignor to American Automatic Devices Co., Chicago, Ill., a corporation of Illinois Application October 25, 1937, Serial No. 170,756

4 Claims. (Cl. 248—229)

My invention relates to rear view mirrors and mounting means therefor and has for its object the provision of a device of this type comprising a new and improved form and arrangement of parts whereby the device may be easily and quickly applied in the desired operative position on the edge of the door of an automobile or on an appropriately formed portion of any other support on an automobile or elsewhere. It is one of the objects of my invention to provide an improved combination of supporting members adjustably connected together for holding a mirror or other object in position, and particularly for holding a mirror in such adjusted position on the outer face of the front door of an autmobile that the driver by glancing at the face of the mirror through the window opening of the door can look directly backwardly along the side of the car.

It is one of the objects of my invention to provide an improved form of bracket and supporting arm member connected therewith whereby a single securing part may be effective for attaching the bracket in position on a support and for locking the arm in adjusted position with respect to the bracket.

It is another object of my invention to improve devices of this type in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing,—

Fig. 1 is a side view of a portion of the body of an automobile with my improved mirror device in position on the front edge of the front door;

Fig. 2 is a top plan view of my device in position on a fragmentary portion of a door, some of the parts being shown in cross section, and changed positions of some of the parts being indicated by dotted lines;

Fig. 3 is a vertical cross-sectional view taken at line 3—3 of Fig. 2;

Fig. 4 is a horizontal sectional view taken at line 4—4 of Fig. 3;

Fig. 5 is a vertical sectional view taken at line 5—5 of Fig. 2; and

Fig. 6 is a vertical sectional view taken at line 6—6 of Fig. 2.

Referring now to the several figures of the drawing, in which corresponding parts are indicated by the same reference characters, 10 indicates a portion of the body of an automobile having a front door 11 hingedly mounted thereon in any approved manner, such door being provided with a plate glass window 12 therein as usual. As is clearly shown in Figs. 2 and 4, the front edge of the door 11 is provided with a forwardly extending rib or flange 13 upon which I have mounted my improved supporting bracket 14 and its associated parts.

In the arrangement shown, my improved bracket 14 is in the form of a channel being pressed out of sheet metal so as to provide a short leg 15 at one side and a comparatively much longer leg 16 at the opposite side, the leg 16 being pressed into the form of a housing opening toward the leg 15. Within the channel member 14 adjacent to the inner face of the leg 16 I have provided a bearing plate 17 having a lip 18 in the form of a ring or socket extending through an opening in the wall of the leg 16 at 19, the wall of the leg 16 above and below the opening at 19 being pressed inwardly opposite the socket portion 18 so as to provide for the ready insertion of an arm into the socket. Adjacent to the socket member 18, I have mounted a locking bolt 20 which is adjustable by means of screw threads so as to press upon the outer face of the pressure plate 17.

Within the socket provided by the leg 16 and the pressure plate 17, I have mounted the end portion 21 of an arm 22 standing in substantially vertical position with respect to said end portion. At its opposite end, the arm 22 is turned again at right angles, being provided with a sleeve 23 which is securely mounted upon the arm so as to provide a socket 24 at the end face of the arm. Within the socket 24, I have mounted a heavy coiled spring 25 which bears at its outer end against a spherical head 26 formed on the end of a pin 27, a rounded wear plate 28 being interposed between the spring and the head 26 in the arrangement shown. The head 26 is held in position within the socket so as to substantially compress the spring 25 by the spunover front edge portion 29 of the sleeve 23, the arrangement being such that the pin 27 is capable of adjustment angularly in all directions with respect to the sleeve 23 up to the limits controlled by the extension of the pin from the end of the socket. The arrangement is such that the pin 27 is held by friction in any adjusted position to which it is moved with respect to the sleeve 23 and the arm 22.

Upon the outer end of the pin 27 I have mounted a casing member 30 formed of sheet metal and provided in its front face with a mirror 31 of glass or other suitable material as is indicated by dotted lines in Fig. 2. Upon the pin 27 at opposite faces of the wall of the casing 30 I have mounted a washer 32 of ordinary construction and a washer 33 of special construction arranged so that when the outer end of the pin 27 is upset by the application of heavy pressure thereon the washer 33 is distorted slightly so as to insure that there shall be a tight joint between the pin 27 and the casing member 30.

When the bracket 14 is mounted in position upon the front edge of the door 11, a piece of fiber 34 is preferably inserted between the face of the door and the pressure plate 17, as is best shown in Fig. 4. The locking bolt 20 is then moved toward the pressure plate 17 so as to press the edge of the plate firmly against the rib or flange 13 of the door and at the same time to press the lip 18 against the face of the turned end portion 21 of the arm 22. When the locking bolt 20 is tightened, the bracket 14 is held securely against movement with respect to the door and the arm 22 is held securely against movement with respect to the bracket. The grip of the lip 18 of the pressure plate against the end portion 21 of the arm is not so strong as to prevent swinging movement of the arm with respect to the bracket when considerable force is applied thereto, but it is sufficient for holding the arm in the desired adjusted position under normal conditions of use.

With the mirror mounted in position upon the outer face of the glass 12 of the door, the arm can be swung to the desired adjusted position by the application of the required pressure thereto, and the casing 30 and glass 31 can be adjusted to the desired angular position both horizontally and vertically with respect to the arm for holding the mirror in such position as to enable the driver to see backwardly along the side of the car. The arrangement of my device is such that the device as a whole can be very quickly and very easily attached in position upon the front edge of the door of a car, regardless of whether the door opens forwardly or opens backwardly, the position of the mirror being such that it does not interfere in any way with the opening or closing movements of the door.

While I prefer to employ the form of device as shown in my drawing and as above described, it is to be understood that my invention is not limited thereto except so far as it may be so limited by the claims, it being understood that changes might well be made from the arrangement shown without departing from my invention.

I claim:—

1. In an adjustable mounting device for a mirror and the like, the combination of a bracket member in the form of a channel, a bearing plate arranged adjacent to the inner face of one of the legs of said channel and having a socket portion extending through an opening in said leg, adjustable locking means carried by said leg for moving said bearing plate into gripping relation with respect to the other leg for clamping the bracket in position on the edge of a support extending into said channel, and an arm swingingly mounted in the socket portion of said bearing plate on the outer face of said first named leg and arranged so that said adjustable locking means when tightened for clamping the bracket in position serves to hold said arm from swinging with respect to the bracket.

2. In an adjustable mounting device for a mirror and the like, the combination of a bracket member in the form of a channel, a bearing plate arranged adjacent to the inner face of one of the legs of said channel and having a socket portion extending through an opening in said leg, a locking bolt secured by screw threads in an opening in said leg for moving said bearing plate into gripping relation with respect to the other leg for clamping the bracket in position on the edge of a support extending into the channel, and an arm swingingly mounted in the socket portion of said bearing plate on the outer face of said first named leg and arranged so that said locking bolt when tightened for clamping the bracket in position serves to hold said arm from swinging with respect to the bracket.

3. In an adjustable mounting device for a mirror and the like, the combination of a bracket comprising two plates in spaced relation opposite to each other and connected at their edges in the form of a channel adapted for mounting on the edge of a support, a bearing plate in such channel arranged for a pivotal connection with one of the plates of the channel by means of a loop on one of said plates extending through an opening in the other plate, an arm having a turned end portion extending into said loop for pivotally mounting the arm on said bracket, and adjustable means for applying heavy pressure on the face of said bearing plate for tightening said loop about said arm and tightening the bearing plate against the face of the support upon which the channel is mounted.

4. In an adjustable mounting device for a mirror and the like, the combination of a bracket comprising two plates in spaced relation opposite to each other and connected at their edges in the form of a channel adapted for mounting on the edge of a support, a bearing plate having one end portion located inside of the channel in position to bear against the face of the support upon which the channel is mounted and having a portion at its opposite end in outwardly spaced relation to one of said channel plates and shaped so as to provide a socket by cooperation with said channel plate, an arm having a turned end portion extending into said socket for pivotally mounting the arm on said bracket, and adjustable means carried by said bracket for applying heavy pressure on the face of said bearing plate for tightening said socket about said arm and tightening the bearing plate against the face of the support upon which the channel is mounted.

ANDREW D. KONDRATH.